United States Patent [19]

Motoyama et al.

[11] Patent Number: 4,619,480
[45] Date of Patent: Oct. 28, 1986

[54] SUNROOF PANEL OPENING/CLOSING APPARATUS

[75] Inventors: Kichizo Motoyama, Tokyo; Yoshiharu Araki, Ueda, both of Japan

[73] Assignees: Kabushiki Kaisha Johnan Seisakusho, Ueda; Aichi Machine Industry Co., Ltd., Nagoya, both of Japan

[21] Appl. No.: 655,566

[22] Filed: Sep. 28, 1984

[30] Foreign Application Priority Data

Sep. 29, 1983 [JP] Japan ................................ 58-181366

[51] Int. Cl.$^4$ ........................... B60J 7/22; B60J 7/053; B60J 7/057; B60J 7/185
[52] U.S. Cl. .................................. 296/217; 296/222; 296/223; 296/224
[58] Field of Search ............... 296/216, 217, 220, 222, 296/223, 224

[56] References Cited

U.S. PATENT DOCUMENTS

| Re. 28,346 | 2/1975 | Kilianstadten | 296/222 |
| 4,420,184 | 12/1983 | Kaltz | 296/223 |
| 4,422,687 | 12/1983 | Kaltz et al. | 296/222 |

FOREIGN PATENT DOCUMENTS

| 1946161 | 3/1971 | Fed. Rep. of Germany | 296/222 |
| 59-30568 | 7/1984 | Japan |  |

Primary Examiner—Robert B. Reeves
Assistant Examiner—Dennis H. Pedder
Attorney, Agent, or Firm—Schwartz, Jeffery, Schwaab, Mack, Blumenthal & Evans

[57] ABSTRACT

A forward sunroof panel is first tilted front down to its open position and then a rearward sunroof panel is lowered back down and slid along and under a roof panel to its open position in regular sequence by shifting only a single wire driven by a motor. When the two sunroof panels are required to be closed, the wire is shifted in the reverse direction to first slide out the rearward panel from under the roof panel, then to raise it and finally to tilt the forward panel to its closed position. The apparatus comprises, in particular, a forward panel tilting mechanism including a latch and a detent lever and a rearward panel sliding mechanism including a pair of link arms and a set of three telescope brackets.

4 Claims, 25 Drawing Figures

F.PANEL CLOSED

F.PANEL TILTED OPEN

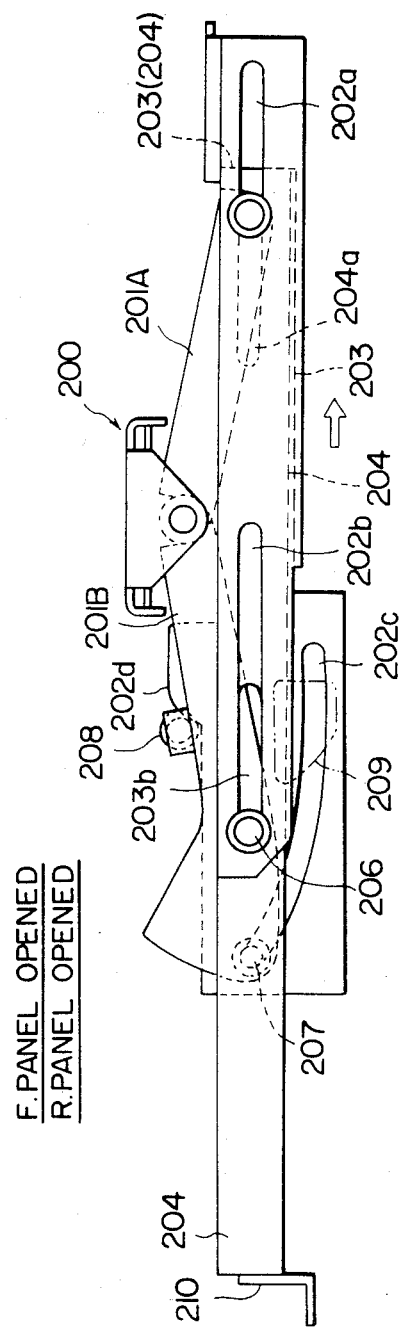

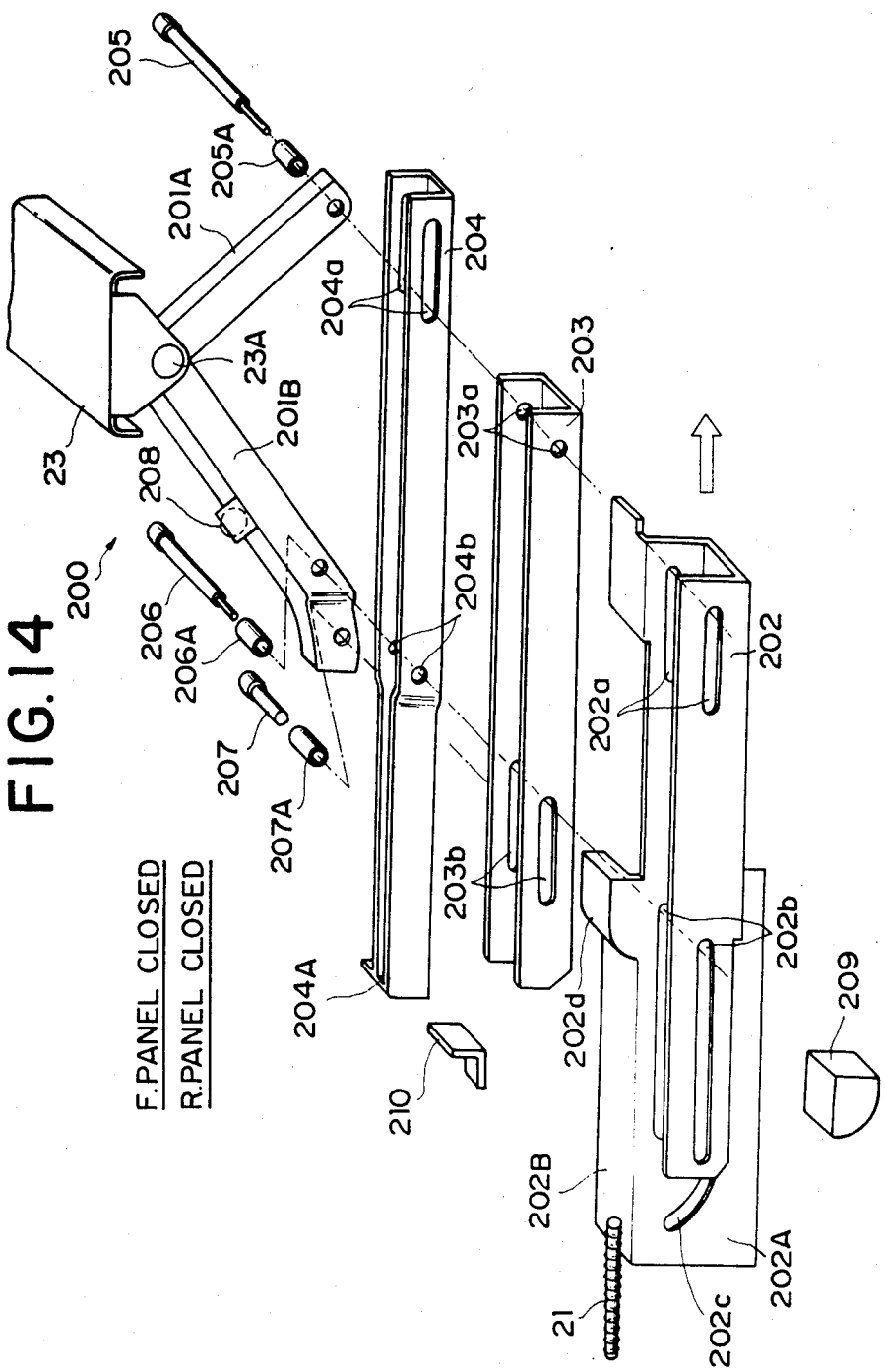

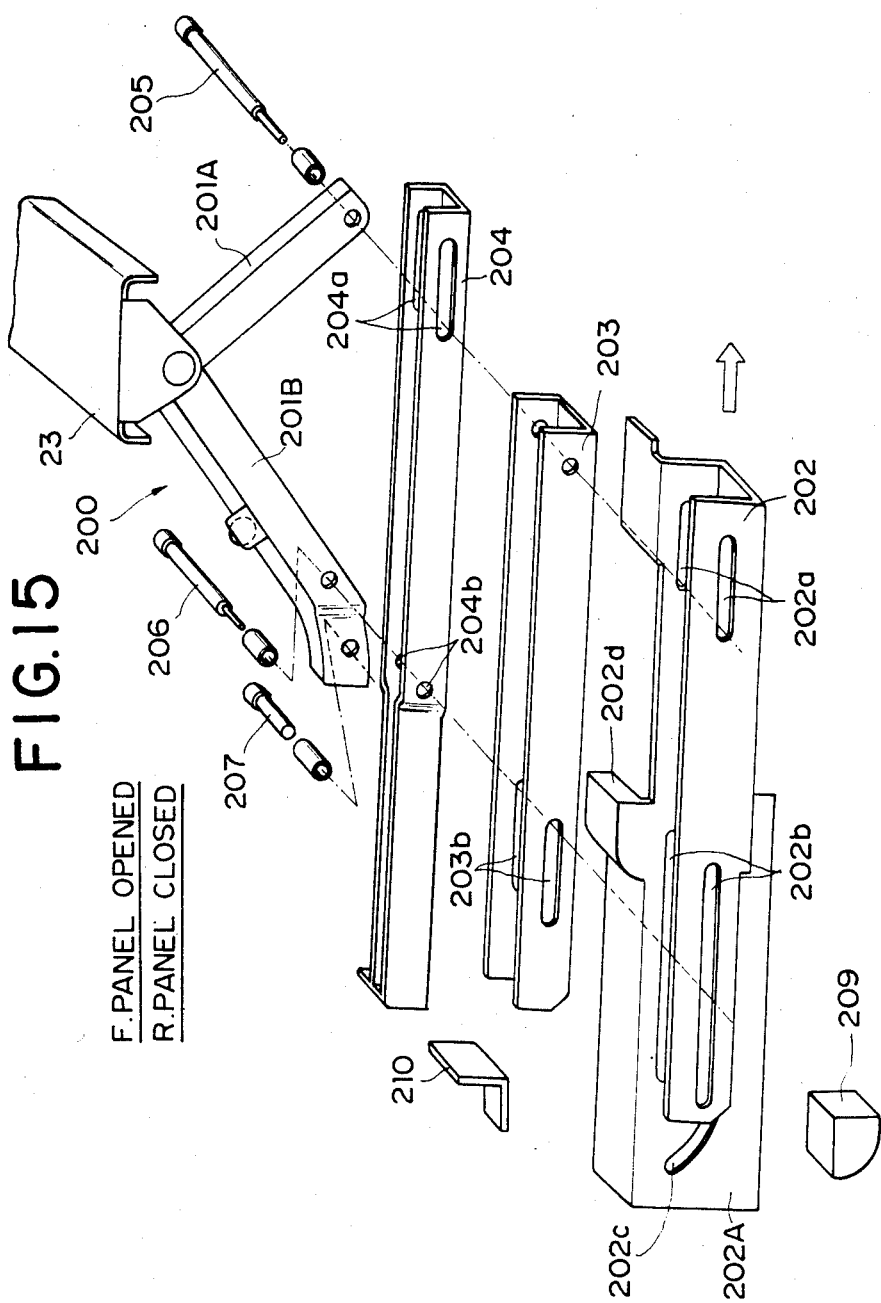

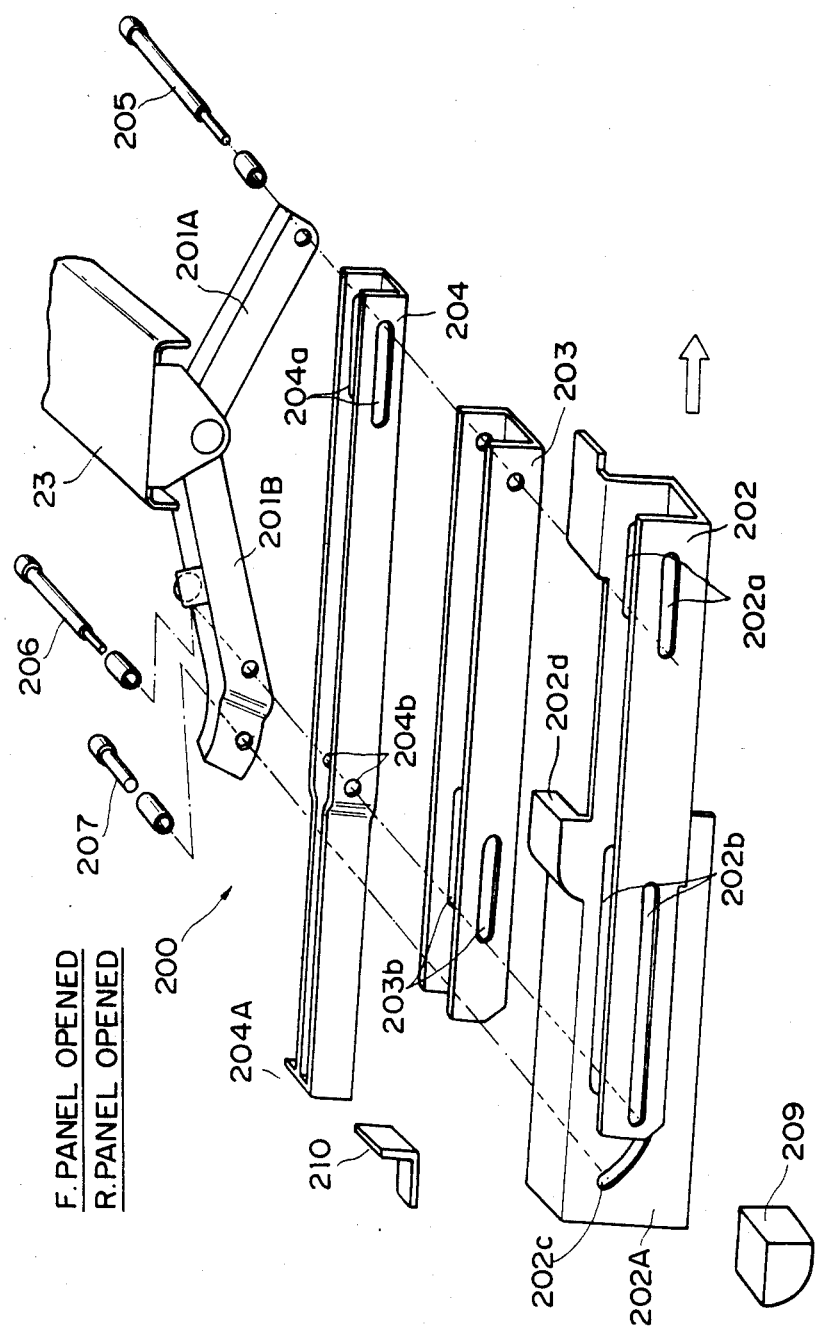

SUNROOF PANEL OPENING/CLOSING APPARATUS

BACKGROUND OF THE INVENTION

1. Field of the Invention

The present invention relates generally to a sunroof panel opening and/or closing apparatus for an automotive vehicle, and more particularly to an apparatus for opening and/or closing in regular sequence two movable sunroof panels arranged on a roof panel of an automotive vehicle. Here, sunroof implies an automobile roof having an openable panel. The two movable sunroof panels are a forward sunroof panel which can be tilted forward front down to form a windscreen and a rearward sunroof panel which can be shifted rearward into an envelope formed by two stationary roof panels when the sunroof panel is open.

2. Description of the Prior Art

Sunroofs are well known accessories in automotive vehicles. In the sunroof, an aperture is formed in a roof panel of an automotive vehicle and a single opened and/or closed sunroof panel is attached to a roof panel aperture in order to improve ventilation and to provide an expansive passenger compartment atmosphere. In these prior-art sunroof structures, only a single sunroof panel is usually slid along and under the roof panel. In these single sunroof panel structures, however, when the sunroof panel is shifted or opened, rain directly falls into the passenger compartment.

To overcome the above-mentioned drawbacks, recently a sunroof composed of two movable panels has been proposed, in which a forward sunroof panel is tilted forward front down to form a windscreen and a rearward sunroof panel is shifted rearward into an envelope formed by two stationary roof panels. A sliding sunroof for automotive vehicles of the above-mentioned type is disclosed in German Patent DT No. 1 946 161. In this prior-art sunroof panel opening and/or closing apparatus, since two movable sunroof panels are driven independently by means of two separate panel driving wires, there exists a problem in that the structure is complicated and thick, thus resulting a higher manufacturing cost.

The arrangement of the prior-art sunroof panel opening and/or closing apparatus disclosed in German Patent DT No. 1 946 161 will be described in more detail hereinafter with reference to the attached drawings under DETAILED DESCRIPTION OF THE PREFERRED EMBODIMENT.

SUMMARY OF THE INVENTION

With these problems in mind, therefore, it is the primary object of the present invention to provide a sunroof panel opening and/or closing apparatus having two movable panels for an automotive vehicle which is simple and thin in structure and therefore low in cost, easy to handle and excellent in expansiveness of passenger compartment atmosphere. To achieve the above-mentioned object, an apparatus for opening and/or closing a forward sunroof panel and a rearward sunroof panel attached to an aperture formed in a roof panel of a vehicle body according to the present invention comprises (a) a motor; (b) a pair of lefthand and righthand geared wires each arranged along a guide rail disposed under the roof panel and driven by said motor in the rearward and forward directions; (c) a pair of lefthand and righthand forward panel tilting mechanisms associated with said geared wires, respectively, for tilting the forward sunroof panel front down to its open position when said geared wires are shifted by a first wire stroke by said motor and for tilting the forward sunroof panel to its closed position when said geared wires are reversely shifted by the first wire stroke by said motor; and (d) a pair of lefthand and righthand rearward panel sliding mechanisms associated with said geared wires, respectively, for first lowering one end of the rearward sunroof panel and then sliding the rearward panel along and under the roof panel to its open position when said geared wires are further shifted by a succeeding second wire stroke by said motor while keeping the forward sunroof panel open, and for first sliding out the rearward sunroof panel from under the roof panel and then raising one end of the rearward sunroof panel to its closed position when said geared wires are reversely shifted by the second wire stroke by said motor while keeping the forward sunroof panel open.

To achieve the above-mentioned object, a method of opening and/or closing a forward sunroof panel and a rearward sunroof panel both attached to an aperture formed in a roof panel of a vehicle body according to the present invention comprises the following steps of: (a) shifting a pair of lefthand and righthand geared wires rearward by a first stroke along each guide rail attached to the roof panel by a motor in order to tilt up the forward sunroof panel to its open position with one end of the forward sunroof panel as a fulcrum; (b) further shifting the geared wires rearward by a succeeding second stroke along the guide rail in order to first lower one end of the rearward sunroof panel and then slide it along and under the roof panel to its open position while keeping the forward sunroof panel open; (c) reversely shifting the geared wires forward by the succeeding second stroke along the guide rail in order to first slide out the rearward sunroof panel from under the roof panel and then raise the one end thereof to its closed position while keeping the forward sunroof panel open; and (d) reversely shifting the geared wires further forward by the first stroke along the guide rail in order to tilt down the forward sunroof panel to its closed position with one end of the forward sunroof panel as a fulcrum.

BRIEF DESCRIPTION OF THE DRAWINGS

The features and advantages of the sunroof panel opening and/or closing apparatus for an automotive vehicle according to the present invention over the prior-art apparatus will be more clearly appreciated from the following description of the preferred embodiment of the invention taken in conjunction with the accompanying drawings in which like reference numerals designate the same or similar elements or sections throughout the figures thereof and in which:

FIG. 1-A illustrates the position at which the forward sunroof panel and the rearward sunroof panel are both closed;

FIG. 1-B illustrates the position at which forward sunroof panel is tilted forward front down with the rearward sunroof panel kept closed;

FIG. 1-C illustrates the position at which rearward sunroof panel is shifted rearward into an envelope formed by two stationary roof panels with the forward sunroof panel kept opened;

FIG. 1-D illustrates the position at which the forward sunroof panel is once closed with the rearward sunroof panel kept shifted into the envelope; and FIG. 1-E illustrates the position at which the forward sunroof panel is further shifted rearward with the rearward sunroof panel kept shifted into the envelope;

FIG. 2-A is a partial cross-sectional side view illustrating the two pinions engaged with the four geared wires and the handle slidably engaged with the two pinions;

FIG. 2-B is a top view illustrating the gearing condition between geared wires and pinions;

FIG. 2-C is a partial cross-sectional side view illustrating the two pinions and a slidable handle shaft formed with a male spline;

FIG. 3-A illustrates the position at which the forward sunroof panel and the rearward sunroof panel are both closed;

FIG. 3-B illustrates the position at which the forward sunroof panel is tilted forward front down with the rearward sunroof panel kept closed;

FIG. 3-C illustrates the position at which the rearward sunroof panel is tilted back down or lowered with the forward sunroof panel kept opened; and FIG. 3-D illustrates the position at which the rearward sunroof panel is shifted rearward along and under the roof panel with the forward sunroof panel kept opened;

FIG. 13 is a side view illustrating the rearward panel sliding mechanism similar to FIG. 10, which indicates the position at which the forward sunroof panel and the rearward sunroof panel are both opened;

FIG. 14 is a perspective view illustrating the rearward panel sliding mechanism of the sunroof panel opening and/or closing apparatus according to the present invention, which indicates the position at which the forward sunroof panel and the rearward sunroof panel are both closed, corresponding to FIG. 10;

FIG. 15 is a similar perspective view illustrating the rearward panel sliding mechanism, which indicates the position at which the forward sunroof panel is opened but the rearward sunroof panel is closed, corresponding to FIG. 12; and FIG. 16 is a similar perspective view illustrating the rearward sunroof panel sliding mechanism, which indicates the position at which the forward sunroof panel and the rearward sunroof panel are both open, corresponding to FIG. 13.

DETAILED DESCRIPTION OF THE PREFERRED EMBODIMENT

Figure 1A:
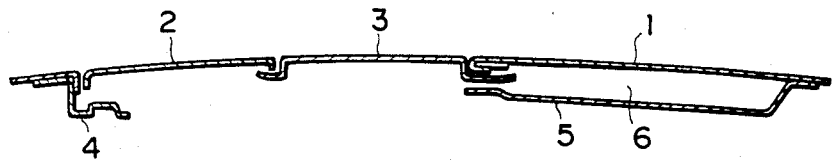
FIGS. 1-A to 1-E are cross-sectional views illustrating the sequence of opening of two movable sunroof panels used for a prior-art sunroof panel opening and/or closing apparatus.
Figure 1B:
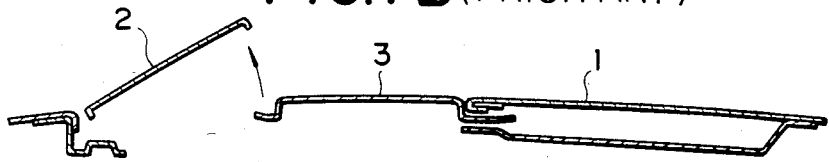
Figure 1C:
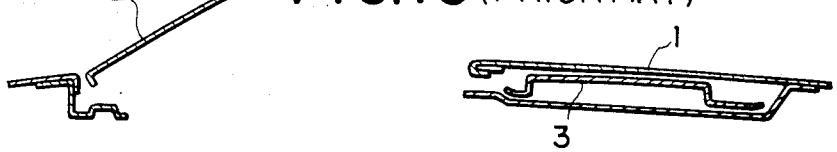
Figure 1D:
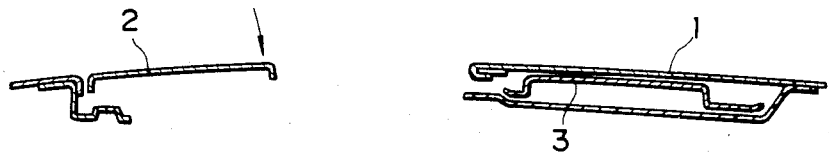
Figure 1E:
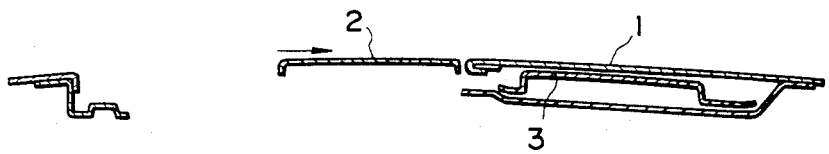

To facilitate understanding of the present invention, a brief reference will be made to a prior-art sunroof panel opening and/or closing apparatus disclosed in German Patent No. DT 1 946 161 with reference to FIGS. 1-A to 1-E and FIGS. 2-A to 2-C.

FIGS. 1-A to 1-E illustrate the operation sequence of opening of two movable panels. In FIG. 1-A, the reference numeral 1 denotes a stationary roof panel of a vehicle body. A tiltable forward sunroof panel 2 and a slidable rearward sunroof panel 3 are both arranged at an aperture formed in the stationary roof panel 1. Further, the reference numeral 4 denotes a recessed roof frame; the reference numeral 5 denotes another stationary roof panel to form an envelope 6 in cooperation with a part of the stationary roof panel 1 for housing the slidable rearward sunroof panel 3 when it is slidably opened.

Figure 2A:
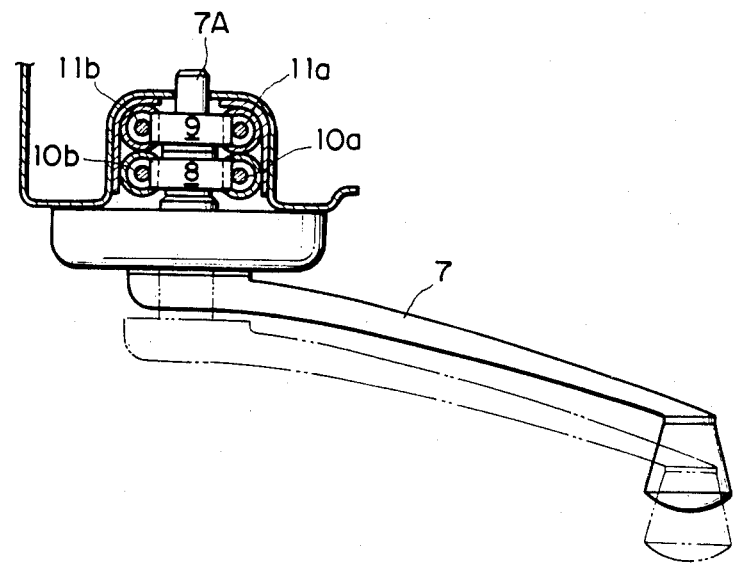
FIGS. 2-A to 2-C are partial cross-sectional views or a top view illustrating two pinions and two geared wires both driven by a handle used for the prior-art sunroof panel opening and/or closing apparatus.

FIG. 1-A indicates the position at which the forward sunroof panel 2 and the rearward sunroof panel 3 are both closed on the roof panel 1. FIG. 1-B indicates the position at which the forward sunroof panel 2 is tilted forward front down and the rearward sunroof panel 3 is closed; FIG. 1-C indicates the position at which the forward sunroof panel 2 is tilted forward or opened and additionally the rearward sunroof panel 3 is shifted into the envelope 6 or opened; FIG. 1-D indicates the position at which the forward sunroof panel 2 is tilted down or closed but the rearward sunroof panel 3 is shifted into the envelope 6; and FIG. 1-E indicates the position at which the forward sunroof panel 2 is additionally shifted rearward to the rearmost position in the aperture and the rearward sunroof panel 3 is shifted into the envelope 6. These five positions as described above can be attained by rotating a handle 7 as shown in FIG. 2-A. In FIG. 2A, the handle 7 is rotated with a handle shaft 7A as a center. The handle shaft 7A is formed with a male spline 7a as shown in FIG. 2-C. A pair of a first panel driving pinion 8 and a second panel driving pinion 9 are both formed with a female spline, respectively. These two pinions 8 and 9 are slidably fitted to the handle shaft 7A by mating the male spline 7a of the handle shaft 7A with the female splines of the two pinions 8 and 9.

The first panel driving pinion 8 is so arranged as to be engaged with a pair of two forward panel driving geared wires 10a and 10b; the second panel driving pinion 9 is also so arranged as to be engaged with a pair of two rearward panel driving geared wires 11a and 11b. As best shown in FIG. 2-B, these wires 10a and 10b, and 11a and 11b are flexible wires in which a single steel wire is wound around a twisted wire at regular intervals (pitch) so as to function as a rack in cooperation with a pinion.

The operation of the prior-art sunroof panel opening and/or closing apparatus thus constructed will be described hereinbelow.

Figure 2B:
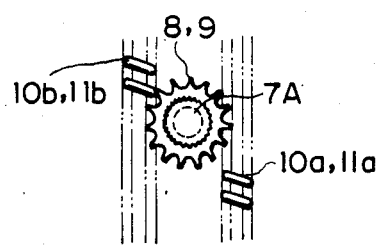
Figure 2C:
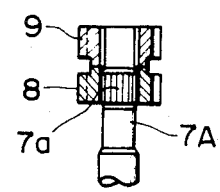

When the handle 7 is set to an upward position as shown by the solid lines in FIG. 2-A, the male spline 7a of the handle shaft 7A engages with the respective female splines of the first and second panel driving pinions 8 and 9. Therefore, when the handle 7 is rotated clockwise, for instance, the two pinions 8 and 9 are both driven in the same direction; as a result, both the forward and rearward panel driving geared wires 10a and 10b, and 11a and 11b are all fed backward, simultaneously. Although not shown, a block member on which the rearward slidable sunroof panel 3 is mounted is shifted also in the backward direction by the geared wires 11a and 11b along a rail guide. Similarly, another block member on which the forward tiltable sunroof panel 2 is mounted via a pivotable member is shifted also in the backward direction by the geared wires 10a and 10b along the rail guide. Therefore, the forward and rearward sunroof panels 2 and 3 are both opened from the close position shown in FIG. 1-A to the open position shown in FIG. 1-C. On the other hand, when the handle 7 is rotated counterclockwise, for instance at the same handle position, the two pinions 8 and 9 are both driven in the reverse direction; as a result, both the forward and rearward panel driving geared wires 10a and 10b, and 11a and 11b are all fed frontward, simultaneously. Therefore, the forward and rearward sunroof panels 2 and 3 are both closed from the open position shown in FIG. 1-C to the close position shown in FIG. 1-A.

When the handle 7 is set to a downward position as shown by the dot-dashed lines in FIG. 2-A, the male spline 7a of the handle shaft 7A is disengaged from the female spline of the second panel driving pinion 9 with the spline 7a kept engaged with that of the first pinion 8. Therefore, when the handle 7 is further rotated clockwise, for instance, only the first pinion 8 is driven; as a result, only the forward panel driving geared wires 10a and 10b are further fed backward. Therefore, the forward sunroof panel 2 is closed and shifted from the open position shown in FIG. 1-C to the half-open position shown in FIG. 1-E. On the other hand, when the handle 7 is rotated counterclockwise, for instance, at the same handle position, only the pinion 8 is driven in the reverse direction; as a result, the forward panel driving geared wires 10a and 10b are fed frontward. Therefore, the forward sunroof panel 2 is shifted and opened from the half-open position shown in FIG. 1-E to the open position shown in FIG. 1-C.

In the prior-art sunroof panel opening and/or closing apparatus, since the two forward and rearward panels are driven independently by means of two separate panel driving geared wires, the structure is complicated and thick, and therefore the manufacturing cost is high.

In view of the above description, reference is now made to an embodiment of the sunroof panel opening and/or closing apparatus for an automotive vehicle according to the present invention.

FIGS. 3-A to 3-D illustrate the operation sequence of opening of two movable sunroof panels, which is similar to FIGS. 1-A to 1-C. In FIG. 3-A, the reference numeral 1 denotes a stationary roof panel of a vehicle body. A tiltable forward sunroof panel 2 and a slidable rearward sunroof panel 3 are both arranged at an aperture formed in the stationary roof panel 1. The reference numeral 20 denotes a guide rail disposed under the stationary roof panel 1, on and along which the forward and rearward sunroof panels 2 and 3 are tilted, lowered or slid. A single flexible geared wire 21 is slidably arranged within and along the guide rail 20. This wire 21 is driven by a motor in the rearward or forward direction to open or close the two sunroof panels 2 and 3 in a predetermined operation sequence. The flexible geared wire 21 is formed by winding a single steel wire around a twisted wire at regular intervals (pitch) so as to function as a rack when geared with a pinion. Further, FIGS. 3-A to 3-D illustrate only one of the lefthand and righthand sides of the sunroof panel opening and/or closing apparatus according to the present invention.

The sunroof panel opening and/or closing apparatus according to the present invention is roughly made up of a forward panel tilting mechanism 100 including a latch 101 and a rearward panel sliding mechanism 200 including a pair of link arms 201. The two mechanisms 100 and 200 are both arranged on the guide rail 20 so as to be associated with the geared wire 21 and slidably shifted along the guide rail 20 when the wire 21 is shifted to and fro. One end of the latch 101 is pivotably connected to the back side of the forward sunroof panel 2 through a forward panel bracket 22 fixed to the forward sunroof panel 2. Each one end of the two link arms 201 is also pivotably connected to the back side of the rearward sunroof panel 3 through a panel supporting member 23 fixed to the rearward sunroof panel 3. Further, the reference numeral 24 denotes another panel supporting member fixed to the front side of the rearward sunroof panel 3. The reference numeral 25 denotes a sliding member slidably arranged on the guide rail 20, one end of which is also pivotably connected to the front side of the rearward sunroof panel 3 through the panel supporting member 24.

FIG. 3-A indicates the position at which the forward sunroof panel 2 and the rearward sunroof panel 3 are both closed on the stationary roof panel 1; FIG. 3-B indicates the position at which the forward sunroof panel 2 is tilted open front down and the rearward sunroof panel 3 is closed; FIG. 3-C indicates the position at which the forward sunroof panel 2 is tilted open and additionally the rearward panel 3 is lowered back down; and FIG. 3-D indicates the position at which the forward sunroof panel 2 is tilted open and the rearward panel 3 is shifted open along and under the stationary roof panel 1. These four positions as described above can be obtained by driving a motor as shown in FIG. 4.

Figure 3A:
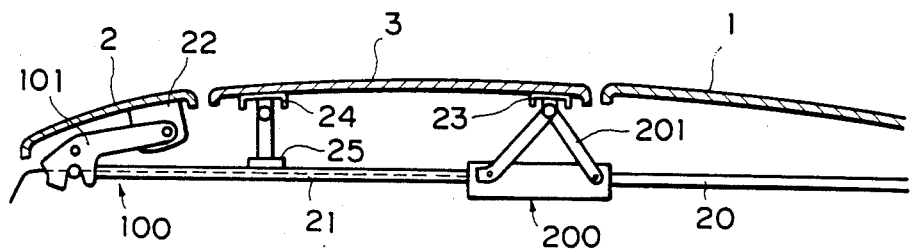
FIGS. 3-A to 3-D are partial cross-sectional view illustrating the sequence of opening of two movable panels used for the sunroof panel opening and/or closing apparatus according to the present invention.
Figure 3B:
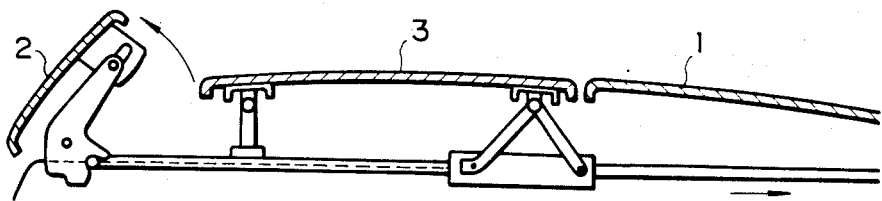
Figure 3C:
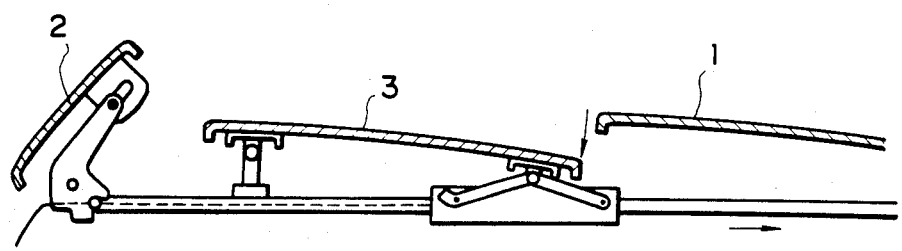
Figure 3D:
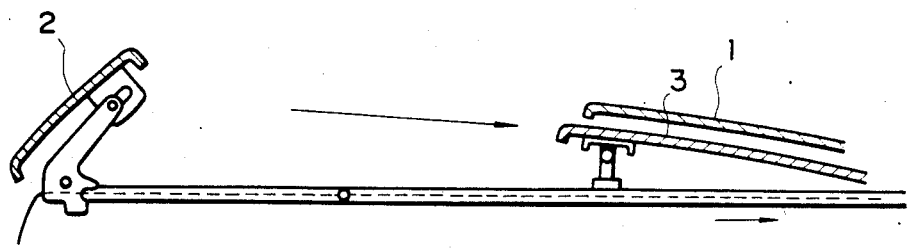
Figure 4:
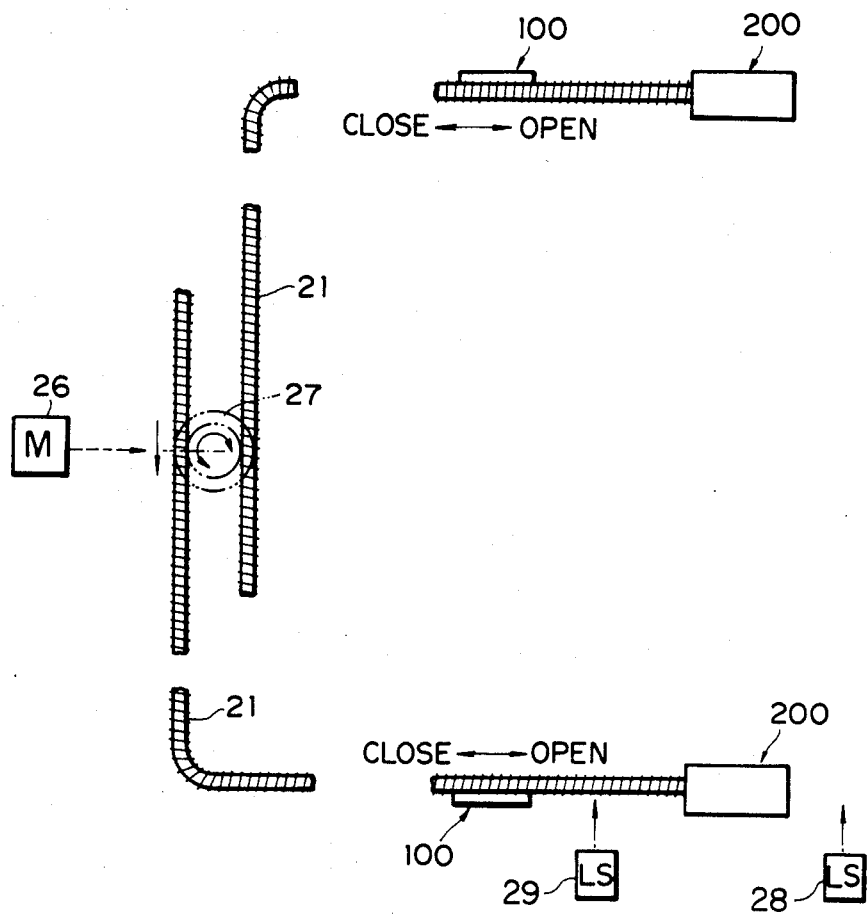
FIG. 4 is a top view illustrating the gearing condition between the two geared wires and a pinion used for the sunroof panel opening and/or closing apparatus according to the present invention.

In FIG. 4, a motor 26 is linked to a single pinion 27. The pinion 27 is arranged so as to be engageable with the two lefthand and righthand flexible geared wires 21 which function as a rack. The forward panel tilting mechanism 100 and the rearward panel sliding mechanism 200 are both fixed to or associated with the geared wire 21, respectively. Further, the reference numeral 28 denotes a first limit switch turned off, for instance, to stop the motor 26 when the mechanism 200 is shifted to a position at which only the forward panel 2 is fully open, as shown in FIG. 3-B, in panel opening operation. The reference numeral 29 denotes a second limit switch turned off, for instance, to stop the motor 26 when the mechanism 200 is shifted to a position at which only the rearward panel 3 is almost closed, as shown in FIG. 3B, in panel closing operation.

Furthermore, in the case where the mechanism 200 is shifted to its extreme positions at which the two panels 2 and 3 are fully closed or opened, as shown in FIG. 3A or FIG. 3D, since a large current flows through the motor 26 and thereby a circuit breaker built in the motor 26 operates to cut off motor driving current, the motor stops without further shifting the mechanism 200.

The operation of the sunroof panel opening and/or closing apparatus thus constructed will be described hereinbelow.

At the position where both the panels 2 and 3 are fully closed as shown in FIG. 3-A, if the motor 26 is driven in the direction that the pinion 27 is rotated counterclockwise, since both the wires 21 are shifted in the rearward direction of the vehicle, the forward panel tilting mechanism 100 and the rearward panel sliding mechanism 200 are both shifted backward on either side of the roof panel 1. Therefore, the forward sunroof panel 2 is first tilted open front down as shown in FIG. 3-B. After the panel 2 has been fully tilted open, one end of the rearward sunroof panel 3 is first lowered back down as shown in FIG. 3-C and subsequently shifted along and under the roof panel 1 as shown in FIG. 3-D. When the rearward panel sliding mechanism 200 is shifted up to the position at which the two panels 2 and 3 are fully open, a circuit breaker operates to stop the motor 26.

In contrast with this, at the position where both the panels 2 and 3 are fully opened as shown in FIG. 3-D, if the motor is driven in the direction that the pinion 27 is rotated clockwise, since both the wires 21 are shifted in the forward direction of the vehicle, the forward panel tilting mechanism 100 and the rearward panel sliding mechanism 200 are both shifted frontward on either side. Therefore, the two panels 2 and 3 are both closed in the reverse sequence from the positiion shown in FIG. 3-D to the position shown in FIG. 3-A. Similarly, when the rearward panel sliding mechanism 200 is shifted up to the position at which the two panels 2 and 3 are fully closed, the circuit breaker operates to stop the motor 26.

Further, it is also possible to open only the forward panel 2 in opening operation by the use of the first limit switch 28 or to close only the rearward panel 3 in closing operation by the use of the second limit switch 29.

The forward panel tilting mechanism 100 will be described in greater detail with reference to FIGS. 5, 6, 7 and 8. The mechanism 100 is roughly made up of a latch 101, a detent lever 102, a fixed bracket 103, a movable bracket 104, a bracket pin 105, a detent lever spring 106, etc.

The fixed bracket 103 is fixed to the guide rail 20. On the fixed bracket 103, the latch 101 is pivotally supported by a latch shaft pin 107 and the detent lever 102 is also pivotally supported by a detent lever shaft pin 108. The latch 101 and the detent lever 102 are so arranged that a claw portion 102A of the detent lever 102 may be engaged with or disengaged from claw stopper portion 101A of the latch 101. Further, the detent lever 102 is urged clockwise in FIG. 6 or toward the latch 101 by the detent lever spring 106 disposed around the detent lever shaft pin 108. Further, the numeral 109 denotes a spring pin implanted in the detent lever 102 to which one end of the detent lever spring 106 is engaged to urge the detent lever 102 clockwise in FIG. 6. The spring pin 109 is engaged in an arcuate slot 103A formed in the fixed bracket 103.

The movable bracket 104 is fixed to the geared wire 21 but movable along the guide rail 20 when the wire 21 is shifted to and fro. The bracket pin 105 is rotatably supported by the movable bracket 104 at such a position as to engage with a recessed portion 101c of the latch 101. Further, the reference numeral 110 denotes a latch pin pivotably connected to the forward panel bracket 22 fixed to the forward sunroof panel 2, as shown in FIG. 3-A.

The operation of the forward panel tilting mechanism 100 will be described hereinbelow with reference to FIGS. 6 and 8.

Figure 6:
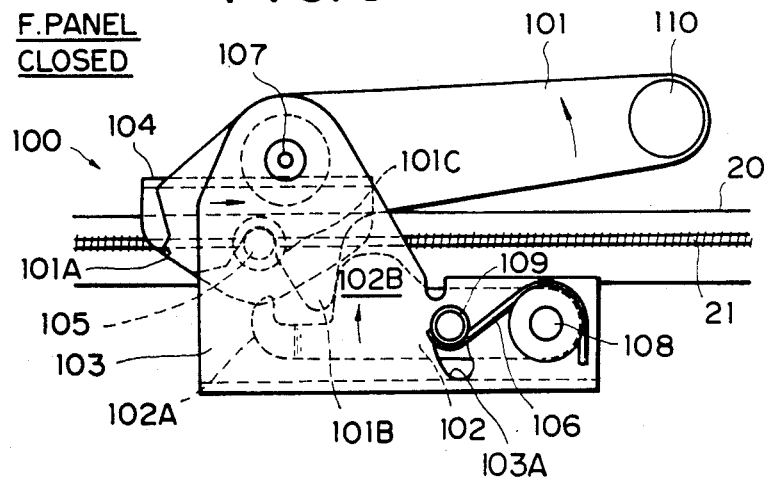
FIG. 6 is a side view illustrating the forward panel tilting mechanism shown in FIG. 5.
Figure 7:
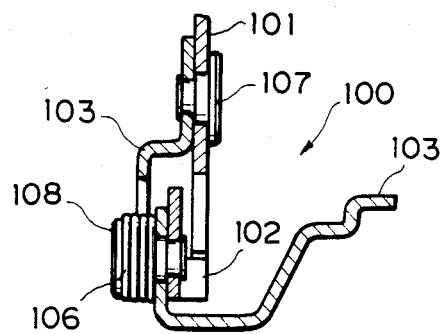
FIG. 7 is a partial cross-sectional view illustrating the forward panel tilting mechanism shown in FIGS. 5 or 6.

FIG. 6 indicates the position at which the latch 101 is tilted down to the position at which the forward sunroof panel 2 is closed as shown in FIG. 3-A. Under these conditions, the bracket pin 105 is fitted to the recessed portion 101c of the latch 101.

Figure 5:
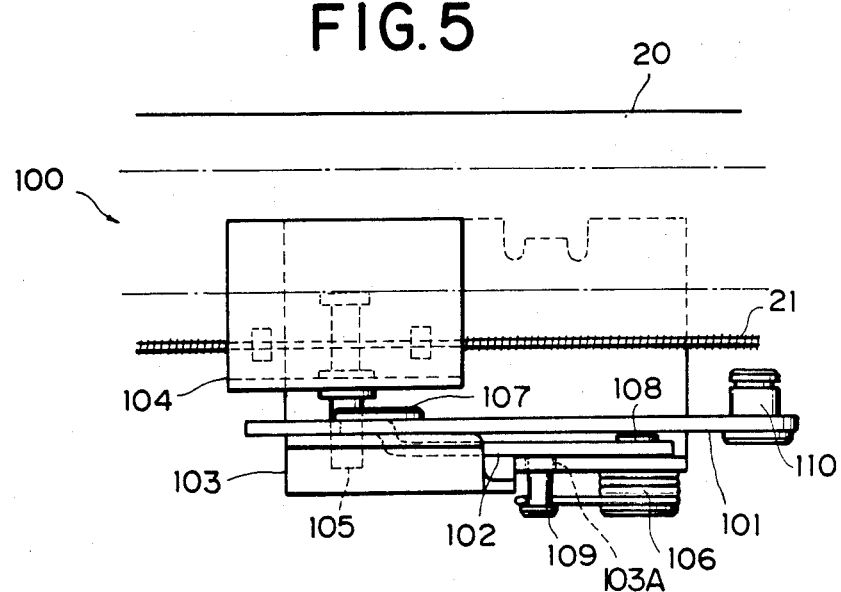
FIG. 5 is a top view illustrating the forward panel tilting mechanism of the sunroof panel opening and/or closing apparatus according to the present invention, which illustrates the position at which the forward sunroof panel is kept closed.

When the movable bracket 104 is shifted by the geared wire 21 to the right in FIG. 6, the bracket pin 105 rotates the latch 101 counterclockwise (the latch 101 is fixed to the guide rail 20 via the fixed bracket 103), so that the forward sunroof panel 2 begins to tilt open. In this case, the bracket pin 105 comes first in contact with the cam portion 102B. When the bracket pin 105 goes away from the cam portion 102B, the claw portion 102A of the detent lever 102 is engaged with the claw stopper portion 101A of the latch 101 by the elastic force of the detent lever spring 106 to lock the latch 101, so that the forward sunroof panel 2 is kept tilted at its open position as shown in FIG. 8. Here, the cam portion 101B is not brought into contact with the cam portion 102B, because these two parts are separated from each other as depicted in FIG. 5. Thereafter, only the movable bracket 104 or the bracket pin 105 is shifted to the right with the latch 101 kept locked by the detent lever 102.

Figure 8:
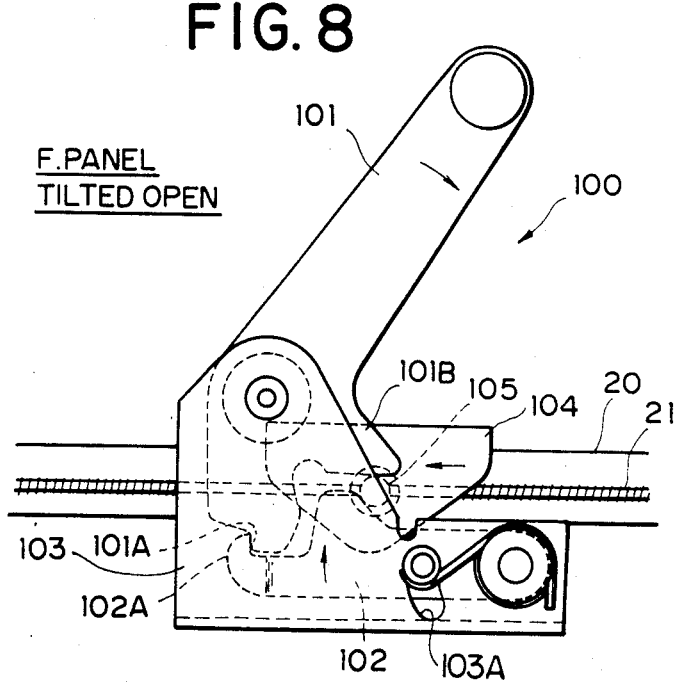
FIG. 8 is a side view illustrating the forward sunroof panel tilting mechanism similar to FIG. 6, which indicates the position at which the forward sunroof panel is kept tilted forward front down.
Figure 9:
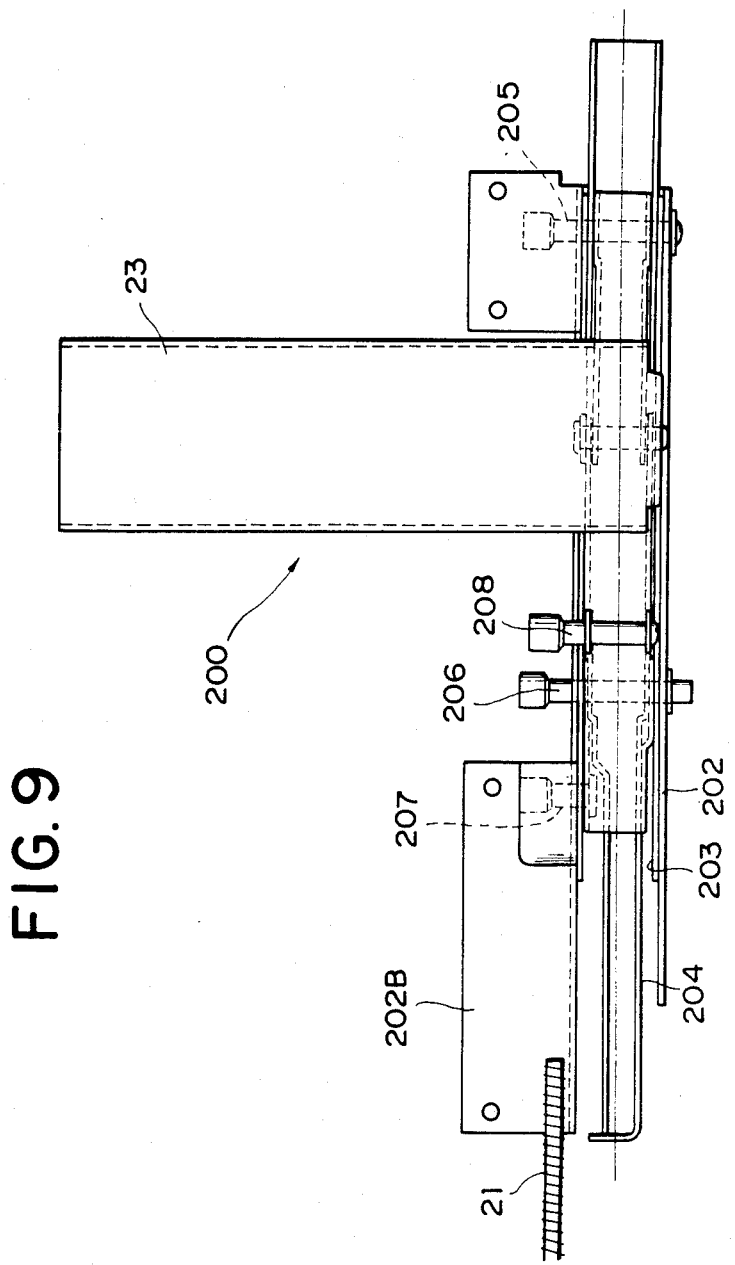
FIG. 9 is a top view illustrating the rearward panel sliding mechanism of the sunroof panel opening and/or closing apparatus according to the present invention, which indicates the position at which the forward sunroof panel and the rearward sunroof panel are both kept closed.

In contrast with this, when the movable bracket 104 is shifted by the geared wire 21 to the left in FIG. 8, the bracket pin 105 is first brought into contact with the cam portion 102B of the detent lever 102 to pivot the detent lever 102 counterclockwise against the elastic force of the spring 106, so that the claw portion 102A is disengaged from the claw stopper portion 101A. Thereafter, the bracket pin 105 rotates the latch 101 clockwise to its close position at which the forward sunroof panel 2 is closed with the bracket pin 105 engaged with the recessed portion 101c of the latch 101. The above-mentioned latch or forward sunroof panel tilting operation is achieved during a first geared wire stroke in either (opening or closing) direction as understood later in relation to the opertion of the rearward panel sliding mechanism 200.

The rearward panel sliding mechanism 200 will be described in greater detail with reference to FIGS. 9 to 16. The mechanism 200 is roughly made up of a pair of short and long link arms 201A and 201B, a set of three U-shaped telescope brackets (an outer bracket 202, a middle bracket 203, and an inner bracket 204), four bracket pins (a rearward slidable pin 205, a forward slidable pin 206 and a link arm pivoting pin 207 and a stopper pin 208), an open stopper member 209, a close stopper member 210, etc.

The outer bracket 202 is formed with a pair of rearward straight slots 202a and a pair of long forward straight slots 202b on either wall thereof. Further, the outer bracket 202 includes a vertically extending wall 202A in which a single longer curved slot 202C is formed and a horizontally extending wall 202B on which a cam portion 202d is provided. Furthermore, the geared wire 21 is fixed to the horizontally extending wall 202B to slide the outer bracket 202 to and fro.

The middle bracket 203 is formed with a pair of pivot holes 203a and a pair of frontward straight slots 203b on either wall thereof. The inner bracket 204 is formed with a pair of rearward straight slots 204a near an end thereof and a pair of pivot holes 204b near a middle portion thereof and on either wall thereof. Here, it should be noted that the length of three pairs of slots 202a, 203b and 204a is almost the same; however, the length of a pair of long slots 202b is roughly twice as long as that of the slots 202a, 203b or 204a. Further, the length of the long curved slot 202C is roughly twice as long as that of the slots 202a, 203b or 204a. A pair of short and long link arms 201A and 201B are pivotably connected together to the panel supporting member 23 at one end thereof via a pin 23A. The rearward slidable pin 205 is rotatably attached to the lower end of the short link arm 201A together with a roller 205A; the forward slidable pin 206 is rotatably attached near the lower end of the long arm link 201B together with a roller 206A; the link arm pivoting pin 207 is rotatably attached to the lowermost end of the long arm link 201B together with a roller 207A. Further, the stopper pin 208 is rotatably attached above the long link arm 201B near the middle portion thereof.

The three brackets 202, 203 and 204 are assembled by placing the middle bracket 203 into the outer bracket 202 and further by placing the inner bracket 204 into the middle bracket 203 so as to be moved telescopically. The rearward slidable pin 205 is perfectly passed through the slots 202a (outer bracket), pivot holes 203a (middle bracket) and the slots 204a (inner bracket); the forward slidable pin 206 is perfectly passed through the longer slots 202b (outer bracket) the slots 203b (middle bracket) and the pivot holes 204b (inner bracket); however, the link arm pivoting pin 207 is passed only through the longer curved slot 202C formed in the vertically extending wall 202A of the outer bracket 202. Further, the stopper pin 208 is not passed through any slots or pivot holes but placed at an appropriate position on the long link arm 201B so as to be brought into contact with the cam portion 202d formed on the horizontally extending wall 202B of the outer bracket 202 when the two link arms are expanded as shown in FIG. 13. This cam portion 202d serves to facilitate the pivotal movement of the two link arms when folded to raise the rearward sunroof panel 3. The mutual relationship between pins 205, 206, 207 and 208 and the holes 203a and 204b or the slots 202a, 202b, 202c, 203b and 204a can better be understood by the perspective views shown in FIGS. 14, 15 and 16.

Further, it should be noted that the open stopper member 209 is fixed to the guide rail at such a position that the link arm pivoting pin 207 is brought into contact with the stopper member 209 when the two link arms are folded or when the rearward sunroof panel 3 is fully closed. This stopper member 209 serves to first expand the two link arms or to lower the rearward panel 3 before the entire mechanism 200 is slid rearward. Additionally, the close stopper member 210 is fixed to the guide rail at such a position that the extreme forward end of the inner bracket 204 is brought into contact with the stopper member 210 when the rearward panel sliding mechanism 200 is returned to the position at which the two link arms are folded to raise the rearward sunroof panel 3. This stopper member 210 serves to decide the position where the two link arms are folded to raise the rearward sunroof panel 3.

Figure 10:
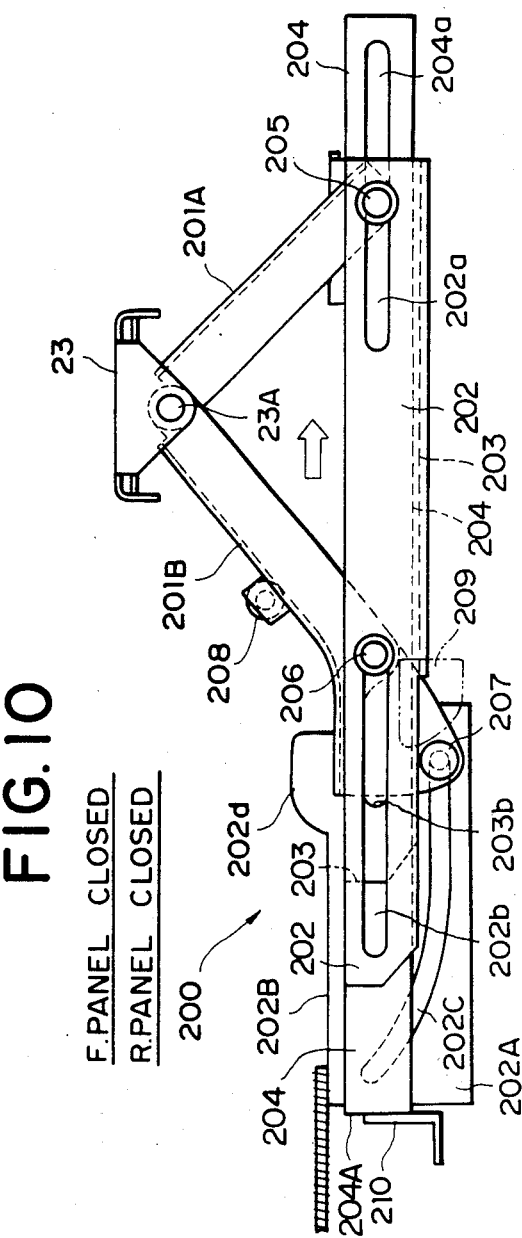
FIG. 10 is a side view illustrating the rearward panel sliding mechanism shown in FIG. 9.
Figure 11:
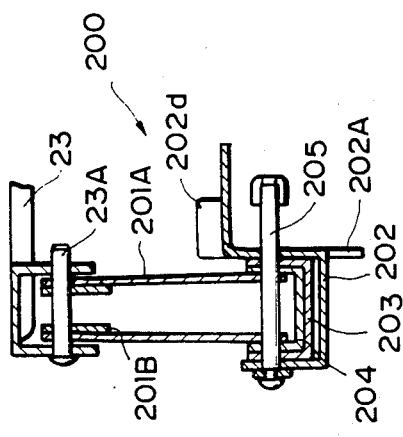
FIG. 11 is a partial cross-sectional side view illustrating the rearward panel sliding mechanism shown in FIGS. 9 or 10.
Figure 12:
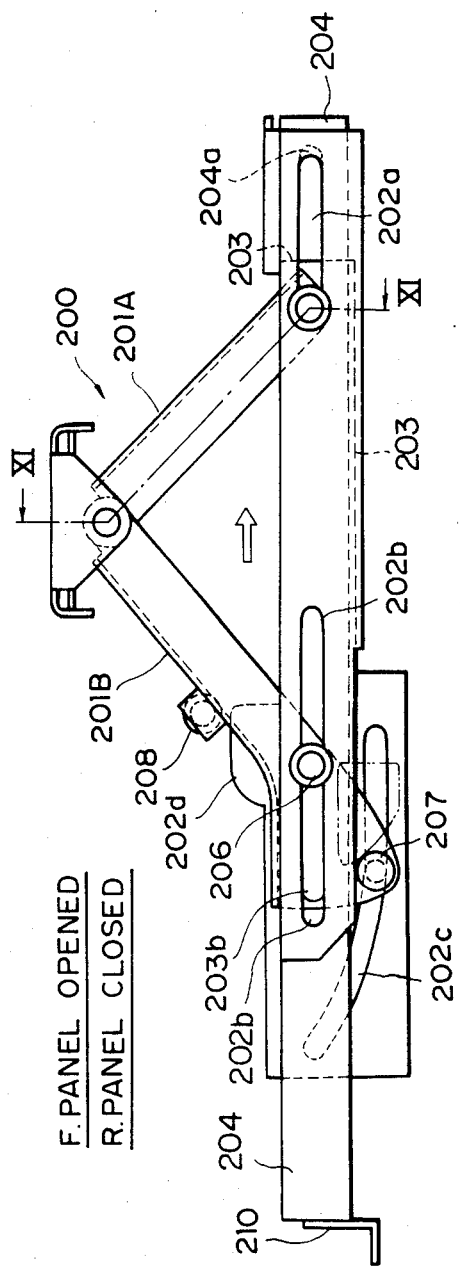
FIG. 12 is a side view illustrating the rearward panel sliding mechanism similar to FIG. 10, which indicates the position at which the forward sunroof panel is opened but the rearward sunroof panel is closed.

The operation of the rearward panel sliding mechanism 200 will be described hereinbelow with reference to FIGS. 10, 12 and 13 and FIGS. 14, 15 and 16. FIGS. 10 and 14 indicate the position at which the forward and rearward sunroof panels 2 and 3 are both closed; FIGS. 12 and 15 indicate the position at which only the forward sunroof panel 2 is tilted open and the rearward sunroof panel 3 is closed; FIGS. 13 and 16 indicate the position at which the forward sunroof panel 2 is tilted open and further the rearward sunroof panel 3 is lowered open.

In FIGS. 10 and 14, three telescope brackets 202, 203 and 204 are all shifted to the leftmost position by the geared wire 21. Under these conditions, the inner bracket 204 is in contact with the close stopper member 210 and the link arm pivoting pin 207 is in contact with the open stopper member 209 as shown. The rearward slidable pin 205 is in contact with the rightmost end of the slots 202a of the outer bracket 202 and with the leftmost end of the slots 204a of the inner bracket 204; the forward slidable pin 206 is in contact with the rightmost end of the long slots 202b of the outer bracket 202 and with the rightmost end of slots 203b of the middle bracket 203; the link arm pivoting pin 207 is in contact with the rightmost end of the long curved slot 202c of the outer bracket 202. Therefore, the two links 201A and 201B are folded to raise the rearward panel supporting member 23.

Under these condition, when the outer bracket 202 is shifted rightward by one step or stroke corresponding to a length of the slots 202a by means of the geared wire 21, since the three pins 205, 206 and 207 can all slide freely along the mated slots 202a, 202b and 202c of the outer bracket 202, the middle and inner brackets 203 and 204 are not shifted at all and therefore the two links 201A and 201B are at rest. During this first step or stroke, the forward panel tilting mechanism 100 is actuated by the geared wire 21 to tilt open the forward sunroof panel 2 to the position as shown in FIG. 3-B. The above-mentioned state is illustrated in FIGS. 12 or 15.

In FIGS. 12 or 15, since only the outer bracket 202 has been shifted by one step, the rearward slidable pin 205 is in contact with the leftmost end of slots 202a of the outer bracket 202; the forward slidable pin 206 is roughly at the midpoint of the longer slots 202b of the outer bracket 202; the link arm pivoting pin 207 is also roughly at the midpoint of the long curved slot 202c of the outer bracket 202.

Under these conditions, when the outer bracket 202 is further shifted rightward by additional one step corresponding to a length of the slots 204a by means of the geared wire 21, since the rearward slidable pin 205 supported by the middle bracket 203 is shifted by the outer bracket 202, the two links 201A and 201B are expanded to lower the panel supporting member 23. Here, it should be noted that the two links can be expanded because the link arm pivoting pin 207 is in contact with the open stopper member 209 fixed to the guide rail. That is to say, since the long link 201B is previously supported by the open stopper member 209, only the short link 201A can first be shifted rightward. However, once the joint of two links 201A and 201B are lowered, since the pivoting pin 207 is shifted a little upward along the long curved slot 202C, the pivoting pin 207 can easily slide along the curved slot 202c to its extreme position as shown in FIG. 13. During this second step, the rearward panel supporting member 23 is lowered to open the rearward sunroof panel 3. The above-mentioned state is illustrated in FIGS. 13 and 16.

In FIGS. 13 and 16, since the outer bracket 202 has been shifted by two steps or two strokes, the forward slidable pin 206 supported by the inner bracket 204 is in contact with the leftmost end of long slots 202b of the outer bracket 202; the rearward slidable pin 205 supported by the middle bracket 203 is in contact with the leftmost end of slots 202a of the outer bracket 202.

Under these conditions, when the outer bracket 202 is further shifted rightward by means of the geared wire 21, the entire rearward panel sliding mechanism 200 is shifted rightward to the position shown in FIG. 3-D, where the rearward panel 3 is moved under the roof panel 1; that is, the panel 3 is perfectly opened.

The operation of closing the rearward sunroof panel 3 will be described hereinbelow. When the geared wire 21 is moved leftward to close the rearward panel 3, the entire rearward panel sliding mechanism 200 is first shifted to the position shown in FIGS. 13 or 16 to bring out the rearward panel 3 from under the roof panel 1. Here, it should be noted that the inner bracket 204 is in contact with the close stopper member 210 and further the stopper pin 208 is in contact with the cam portion 202d of the outer bracket 202 as better shown in FIG. 13. Therefore, when the outer bracket 202 is further shifted leftward, the cam portion 202d thereof rotates the long link 201B counterclockwise with the forward slidable pin 206 as its center, so that the link arm pivoting pin 207 slides down along the long curved slot 202c of the outer bracket 202 to the midpoint of the slots 202c as better shown in FIG. 12.

Thereafter, since the rightmost end of the slots 202a of the outer bracket 202 is in contact with the rearward slidable pin 205 and further the inner bracket 204 is fixed by the close stopper member 210, the rearward slidable pin 205 slides along the slots 204a, so that the two links 201A and 201B are folded to raise the rearward panel supporting member 23 as shown in FIGS. 12 or 15. Thereafter, the mechanism 200 is returned to the original state as shown in FIGS. 10 and 14, while returning the latch 101 to the position at which the forward sunroof panel is tilted down to its closed position.

As described above in the sunroof panel opening and/or closing apparatus according to the present invention, since the two forward and rearward sunroof panels can be opened or closed in predetermined sequence by use of a single motor and a single geared wire, the appartus is simple and thin in structure and therefore low in manufacturing cost. The features of the apparatus according to the present invention are as follows: the forward sunroof panel can be tilted open when the geared wires are driven by the motor during the first step or stroke; the rearward sunroof panel can be lowered back down and further slid along and under the roof panel with the forward sunroof panel kept tilted open when the geared wires are further driven by the motor during the succeeding steps or stroke; and the above steps can be reversed to first close the rearward sunroof panel and to next close the forward sunroof panel.

It will be understood by those skilled in the art that the foregoing description is in terms of a preferred embodiment of the present invention wherein various changes and modifications may be made without departing from the spirit and scope of the invention, as set forth in the appended claims.

What is claimed is:

1. An apparatus for opening and/or closing a forward sunroof panel (2) and a rearward sunroof panel (3) both attached to an aperture formed in a roof panel (1) of a vehicle body, which comprises:

(a) a motor (26);

(b) a pair of guide rails (20);

(c) a lefthand and a righthand geared wire (21), one wire arranged along each guide rail (20) disposed under the roof panel and driven by said motor in rearward and forward directions;

(d) a lefthand and a righthand forward panel tilting mechanism (100), one mechanism associated with each geared wire for tilting the forward sunroof panel front down to its open position when said geared wires are shifted by a first wire stroke by said motor and for tilting the forward sunroof panel to its closed position when said geared wires are reversely shifted by the first wire stroke by said motor, said tilting mechanisms each comprising a latch (101) and a detent lever (102), both pivotally supported by one of the guide rails, said latch being pivoted by a pin (105) fixed to one of said geared wires to a position at which the forward sunroof panel is tilted to its open position and then locked by said detent lever when said geared wires are shifted by said motor, said latch being disengaged from said detent lever by the pin (105) and then pivoted by the pin to the closed position when said geared wires are reversely shifted by said motor; and (e) a lefthand and a righthand rearward panel sliding mechanism (200), one associated with each of said geared wires, for first lowering one end of the rearward sunroof panel and then shifting the rearward panel along and under the roof panel to its open position when said geared wires are further shifted by said motor while keeping the forward sunroof panel open, and for first shifting the rearward sunroof panel from under the roof panel and then raising said one end of the rearward sunroof panel to its closed position when said geared wires are reversely shifted by said motor while keeping the forward sunroof panel open, each of said sliding mechanisms comprising outer, middle and inner telescopic brackets (202, 203, 204), the outer bracket of which is connected to one of said geared wires, and a pair of short and long link arms (201A, 201B) pivotally linked together to a rearward panel supporting member (23) at one end thereof and pivotally linked separately to said telescopic brackets at the other ends thereof; when said outer bracket is shifted by said geared wire , said two link arms being expanded by said telescopic brackets to a position at which the rearward panel supporting member is lowered and then subsequently shifted by said telescopic brackets along and under the roof panel to a position at which the rearward sunroof panel is opened; when said outer bracket is reversely shifted by said geared wire, said two link arms being shifted by said telescopic brackets from under the roof panel and then subsequently folded by said telescopic brackets to a position at which the rearward panel supporting member is raised or the rearward sunroof panel is closed.

2. The apparatus for opening and/or closing a forward sunroof panel (2) and a rearward sunroof panel (3) as set forth in claim 1, wherein said detent lever (102) comprises:

(a) a claw portion (102A);

(b) a cam portion (102B); and (c) a spring (106) for urging said detent lever toward said latch; and wherein said latch (101) comprises:

(a) a recessed portion (101C) with which the pin (105) fixed to said geared wires is engaged when said latch is pivoted down by the pin to a position at which the forward sunroof panel is tilted to its closed position; and (b) a stopper portion (101A) with which said claw portion (102A) of said detent lever (102) is engaged when said latch is pivoted up by the pin to a position at which the forward sunroof panel is tilted to its open position.

3. The apparatus for opening and/or closing a forward sunroof panel (2) and a rearward sunroof panel (3) as set forth in claim 1, wherein (a) said outer bracket (202) includes:

(1) a pair of straight slots (202a) formed near one end thereof;

(2) a pair of longer straight slots (202b) longer than said pair of straight slots and formed near the other end thereof; and (3) a single curved slot (202c) formed also near the other end thereof;

(b) said middle bracket (203) includes:

(1) a pair of pivot holes (203a) formed near one end thereof; and (2) a pair of straight slots (203b) formed near the other end thereof; and (c) said inner bracket (204) includes:

(1) a pair of straight slots (204a) formed near one end thereof; and (2) a pair of pivot holes (204b) formed near a middle portion thereof;

and wherein said pair of said short and long link arms (201A, 201B) comprises:

(a) a rearward slidable pin (205) for linking said short link arm (201A) with the straight slots (202a) of said outer bracket (202), the pivot holes (203a) of said middle bracket (203) and the straight slots (204a) of said inner bracket (204);

(b) a forward slidable pin (206) for linking the said long link arm (201B) with the longer straight slots (202b) of said outer bracket (202), the straight slots (203b) of said middle bracket (203) and the pivot holes (204b) of said inner bracket (204); and (c) a link arm pivoting pin (207) for linking the extreme end of said long link arm (201B) with the curved slot (202c) of said outer bracket (202).

4. The apparatus for opening and/or closing a forward sunroof panel (2) and a rearward sunroof panel (3) as set forth in claim 3, which further comprises:

(a) an open stopper member (209) fixed to the guide rail and so arranged as to be brought into contact with the link arm pivoting pin (207) attached to the extreme end of said long link arm (201B) to facilitate pivotal movement of said link arms at a position where said link arms are expanded to lower the rearward sunroof panel;

(b) a close stopper member (210) fixed to said guide rail and so arranged as to be brought into contact with the extreme forward end of said inner bracket (204) at a position where the link arms (201A, 201B) are folded to raise the rearward sunroof panel;

(c) a cam portion (202d) formed on said outer bracket (202); and (d) a stopper pin (208) so pivotally supported on said long link arm (201B) near the middle portion thereof as to be brought into contact with said cam portion (202d) of said outer bracket to facilitate pivotal movement of said long link arm (201B) at a position where said link arms are folded to raise the rearward sunroof panel.

* * * * *